United States Patent Office 3,192,183
Patented June 29, 1965

3,192,183
POLYMERIZATION OF FORMALDEHYDE
Helmuth Kritzler, Cologne-Flittard, and Kuno Wagner and Erwin Müller, Leverkusen, Germany, assignors to Farbenfabriken Bayer Aktiengesellschaft, Leverkusen, Germany, a corporation of Germany
No Drawing. Filed May 9, 1960, Ser. No. 27,534
Claims priority, application Germany, May 22, 1959, F 28,493
7 Claims. (Cl. 260—67)

The present invention relates to the production of high-grade thermoplastic polyoxymethylenes by polymerization of formaldehyde and more especially to the use of organic azomethine compounds for catalyzing said polymerization of formaldehye.

It is known that formaldehyde can be polymerized in the presence of suitable catalysts, such as for example tertiary and quaternary nitrogen bases and also organometallic compounds and metal alcoholates, to form polyoxymethylenes of high molecular weight.

It has now been found that a number of basic compounds catalyze the polymerization of formaldehyde to high-grade thermoplastic polyoxymethylenes in a particularly advantageous manner. Such catalysts are organic compounds which contain at least one azomethine grouping of the formula:

$$\begin{array}{c}\text{R}\\|\\-\text{C}=\text{N}-\end{array}$$

in the molecule and in which R represents a hydrogen atom, an aliphatic radical having 1 to 20, preferably 1 to 10 carbon atoms (methyl, ethyl, propyl, isopropyl, butyl, hexyl), a cycloaliphatic radical (cyclohexyl, cyclopentyl, methylcyclohexyl), an araliphatic radical (benzyl), an aromatic radical (phenyl, tolyl, chlorphenyl), a hydroxy group in which the hydrogen atom is substituted by an aliphatic, cycloaliphatic, araliphatic, or aromatic monovalent radical as recited above, an amino group in which at least one hydrogen atom may be substituted by an aliphatic, cycloaliphatic, araliphatic, or aromatic radical as recited above.

Examples of classes of compounds to which the catalysts according to the invention belong and which contain the aforementioned atom grouping at least once in the molecule are:

(a) Classes of compounds containing the amidine grouping $$\begin{array}{c}-\text{N}-\\|\\-\text{C}=\text{N}-\end{array}$$

as a common structural feature, for example—

Amidines of aliphatic, cycloaliphatic, araliphatic or aromatic carboxylic acids, the nitrogen atoms of which are unsubstituted or at least partially substituted by aliphatic, cycloaliphatic, araliphatic, and aromatic radicals as recited above said substituents having altogether up to 18 carbon atoms, Guanidine and guanidines which may be at least partially substituted by aliphatic, cycloaliphatic, araliphatic, or aromatic radicals recited above said substituents having altogether up to 30 carbon atoms, Isoureas and isothioureas the oxygen or sulfur atoms respectively of which are substituted by aliphatic radicals having 1 to 6 carbon atoms and the nitrogen atoms of which may be unsubstituted or at least partially substituted by aliphatic, cycloaliphatic, araliphatic, or aromatic radicals having altogether up to 18 carbon atoms, Isomelamines, the ring bonded nitrogen atoms and the imino nitrogen atoms of which are substituted at least partially by aliphatic, cycloaliphatic, araliphatic, aromatic radicals having altogether up to 42 carbon atoms.

(b) Classes of compounds containing the iminoether grouping $$\begin{array}{c}\text{O}-\text{R}_1\\|\\-\text{C}=\text{N}-\end{array}$$

in which $R_1$ represents an aliphatic, cycloaliphatic, araliphatic, or aromatic organic radical as recited above, such as for example:

Iminoethers obtained from the nitriles of the corresponding aliphatic, cycloaliphatic, araliphatic, and aromatic carboxylic acids by reacting with aliphatic, cycloaliphatic, araliphatic, and aromatic hydroxy compounds, lactim ethers of the corresponding five- to nine-membered lactames being substituted at the oxygen atom by aliphatic, cycloaliphatic, araliphatic, or aromatic radicals as disclosed above.

(c) Derivatives of hydrazine which conform to the aforementioned general formula, i.e. which comprise a grouping of the formula

such as for example:

Hydrazones and phenyl hydrazones of aliphatic, cycloaliphatic, araliphatic, and aromatic aldehydes and ketones, Semicarbazones and 4-phenyl semicarbazones of aliphatic, cycloaliphatic, araliphatic, and aromatic aldehydes and ketones as well as the corresponding thiosemicarbazones and 4-phenyl thiosemicarbazones, and Azines of aliphatic, cycloaliphatic, araliphatic, and aromatic aldehydes and ketones.

(d) Schiff's bases of aliphatic, cycloaliphatic, araliphatic and aromatic aldehydes with primary aliphatic, cycloaliphatic, araliphatic and aromatic amines, and Oximes of aliphatic, cycloaliphatic, araliphatic, and aromatic aldehydes and ketones.

The following compounds are specific examples of such catalysts: pentamethyl guanidine, N-phenyl-N',N', N'',N''-tetramethyl guanidine, N,N',N''-triphenyl guanidine, N,N',N''-trimethyl guanidine, O-methyl isourea, O-propyl isourea, O,N,N-trimethyl isourea, S-ethyl isothiourea, S-amyl isothiourea, N,N,N',S-tetramethyl isothiourea, N,N'-dimethyl-S-ethyl isothiourea, 1,3,5-trimethyl isomelamine, 1,3,5-triamyl isomelamine, 1,3,5-triphenyl isomelamine, hexaphenyl isomelamine, 1,3,5-tribenzyl isomelamine, hexa-p-tolyl isomelamine, propion amidine, benzamidine, N-phenyl-N',N'-dimethyl formamidine, N,N'-diphenyl benzamidine, acetiminoethylether, propioniminoethylether, acetiminophenylether, benziminoethylether, benziminoisobutylether, valerolactim-O-methylether, caprolactim-O-butylether, caprolactim-O-benzylether, capryllactim-O-methylether, benzaldehyde hydrazone, acetophenone hydrazone, butyraldehyde phenylhydrazone, acetonephenylhydrazone, benzaldehyde phenylhydrazone, acetophenonephenylhydrazone, propionaldehyde semicarbazone, benzaldehyde semicarbazone, phenylacetaldehyde semicarbazone, acetophenone semicarbazone, acetophenone thiosemicarbazone, valeraldehyde thiosemicarbazone, 4-phenyl-1-benzal - semicarbazide, 4 - phenyl-1-benzal-thiosemicarbazide, dimethylketazine, diphenylketazine, benzaldazine, isopropylidene-diphenyl-methylene-hydrazine, ethylidene-isobutylamine, benzylideneisobutylamine, benzalbenzylamine, acetoxime, benzaldoxime, cyclohexanoneoxime. Substitution products of the aforementioned compounds, such as for example nitro derivatives, halogen derivatives, esters, ethers and the like, may also be used as catalysts.

For carrying out the polymerization process according to the present invention, it is of decisive importance that the entire reaction is conducted under substantially anhydrous conditions. For this purpose, it is necessary to prepare monomeric formaldehyde having a water content of less than 0.5%, and preferably less than 0.1%. In order to prepare monomeric formaldehyde having a water content of less than 0.5%, it is preferred to subject paraformaldehyde, α-polyoxymethylene or trioxane to thermal decomposition and to mix the monomeric formaldehyde in the pyrolysis vessel with a purified, anhydrous, inert carrier gas, for example nitrogen. Thereafter, the formaldehyde is conducted through an extensive cooling system at a temperature of −20° C. In the cooling system, water is frozen out or residues of water are removed by initial polymerization of a part of the formaldehyde. The formaldehyde may be supplied to the polymerization vessel in either gaseous or liquid form. The flow velocity at which the formaldehyde is supplied to the polymerization vessel may be varied and depends firstly on the pyrolysis speed and secondly on the temperature in the polymerization vessel. As reaction media, it is possible with advantage to use anhydrous inert solvents. As inert solvents there may be employed cyclic and acyclic ethers such as dimethyl ether, diethyl ether, dipropyl ether, dibutyl ether, dioxan and tetrahydrofuran; esters, especially esters of saturated alcohols with saturated carboxylic acids such as propyl acetate and butyl acetate; aliphatic, cycloaliphatic, and aromatic hydrocarbons, such as butane, hexane, heptane, cyclohexane, benzene, toluene, and xylene; halogenated, especially chlorinated hydrocarbons such as methylene dichloride, chloroform, carbon tetrachloride, ethylene dichloride, chlorobenzene and dichlorobenzene. The quantity of solvent employed may be varied within wide limits. Generally from 4 to 100 and preferably from 5 to 20, parts by volume of solvent are employed per part by weight of formaldehyde.

The polymerization can be carried out at a temperature of from −120° C. to +100° C., but it has proved advantageous to work at temperatures between −90° C. and +40° C.

Mixtures of two or more of the aforementioned catalysts may be employed in the process according to the present invention. Although the catalysts may be introduced in undissolved form into the reaction medium, it is frequently preferred to introduce the catalyst into the reaction medium in the form of a solution in an inert organic solvent. The catalyst is usually dissolved in the same solvent as that in which polymerization is to take place.

The quantity of catalyst employed may be varied within wide limits. The use of more than 0.2 mol of catalyst per 1000 parts by volume of solvent and less than 0.000001 mol of catalyst per 1000 parts by volume of solvent is in most cases not necessary. It is preferable to employ the catalyst in an amount of from 0.1 to 0.00001 mol per 1000 parts by volume of solvent, since the best results are produced in this concentration range.

After completion of the polymerization, the reaction product is separated from the solvent by filtration or centrifuging. The process may with advantage also be carried out continuously or semi-continuously; fresh catalyst can be added to the reaction medium at the rate at which the high polymer is separated out. The products obtained by the process according to the present invention can be stabilised by the known procedures of acylation or etherification, as described for example in corresponding U.S. patent applications Serial Nos. 1,856, filed January 12, 1960; 13,708, filed March 9, 1960, now Patent No. 3,046,251, and 854,573, filed November 23, 1959; and Belgian Patent No. 583,593.

Advantages of the catalysts according to the invention are their low vapour pressures and the high polymerization velocities which these cause in the polymerization of formaldehyde. By comparison with the known tertiary amine catalysts, the low vapour pressures of the catalysts according to the invention permit a very much more accurate measuring of the quantity of catalyst, since these catalysts are not driven out of the polymerization medium by the formaldehyde area gas. Similarly, polymerization processes in the gas phase outside the polymerization medium are avoided. The high polymerization velocities which are produced by means of the catalysts according to the invention leads to spontaneous polymerization after the formaldehyde has been introduced into the reaction medium, and by comparison with the known tertiary amine catalysts the catalysts according to the invention produce a considerable increase in yield of polyoxymethylenes, based on the formaldehyde introduced into the polymerization vessel, depending on a suitable flow velocity of the formaldehyde and carrier gas. The aforementioned advantages of the catalysts according to the invention are particularly important in the continuous polymerization of formaldehyde, since clogging of the formaldehyde supply pipe and gas discharge pipe is avoided.

An additional advantage arising from the use of the catalysts according to the invention is that the polyoxymethylenes prepared in this way show a considerably more uniform molecular weight distribution than polyoxymethylenes which have been prepared with the known tertiary amine catalysts, such as for example trimethylamine. When using the catalysts according to the invention, polyoxymethylenes are obtained which contain practically no fractions having viscosity values (intrinsic viscosity) below 0.4. Thus, the mechanical properties, for example strength and toughness, of the polyoxymethylenes and their derivatives, such as their acylation and etherification derivatives, are considerably improved.

The polyoxymethylenes produced by the process of the invention and stabilized in accordance with the processes indicated above can be worked up into high-grade plastics with or without the addition of other substances, such as pigments, fillers, plasticizers, stabilizers, anti-oxidizing agents and the like.

*Example 1*

Monomeric formaldehyde is prepared by the thermal decomposition of paraformaldehyde and mixed in the pyrolysis vessel with pure, dry nitrogen as carrier gas. The formaldehyde is thereafter conducted through an extensive cooling system at a temperature of −20° C. and supplied in gaseous form to a polymerization vessel into which have been introduced 1300 parts by volume of anhydrous toluene and 0.0764 part by weight of N-phenyl-N′,N′,N″,N″-tetramethyl guanidine dissolved in 4 parts by volume of anhydrous toluene. The formaldehyde is introduced into the reaction medium, which is cooled to −20° C., over a period of 2 hours and while stirring, whereby polymerization occurs. After stirring for another hour at −20° C., the polymerization product is filtered on a suction filter and freed from adhering solvent by expressing. A pure white polyoxymethylene of high molecular weight is obtained, which is extracted by stirring twice with methanol and twice with acetone. The product is thereafter dried for 4 hours at 60° C. in vacuo. The yield is 111 g., this being 92.5% calculated on the formaldehyde (120 g.) actually introduced into the polymerization vessel. The intrinsic viscosity of the formaldehyde polymer, measured in butyrolactone at 150° C., is 1.1.

*Example 2*

The procedure is analogous to that of Example 1. 0.0516 part by weight of pentamethyl guanidine, dissolved in 4 parts by volume of anhydrous toluene, is added to 1300 parts by volume of anhydrous toluene. The gaseous, monomeric, anhydrous formaldehyde is introduced into the polymerization vessel over a period of 2½ hours. After working up as described in Example 1 142 g. of pure white polyoxymethylene are obtained, this corresponding to a yield of 93.5%, calculated on the amount of formaldehyde (152 g.) actually introduced into the polymerization vessel. The intrinsic viscosity of the polymer is 1.18 (measured in butyrolactone at 150° C.).

Example 3

Monomeric, gaseous, anhydrous formaldehyde is prepared as described in Example 1. A solution of 0.0528 part by weight of tetramethylisothiourea, 4 parts by volume of anhydrous toluene is added to 1300 parts by volume of anhydrous toluene. The gaseous formaldehyde is introduced into the polymerization medium over a period of 2 hours and thereafter worked up as described in Example 1. 101 g. of pure white polyoxymethylene are isolated; this corresponds to a yield of 94.5%, based on the formaldehyde (107 g.) actually introduced into the polymerization vessel. The intrinsic viscosity of the polyoxymethylene is 1.49 (measured in butyrolactone at 150° C.).

Example 4

Gaseous, monomeric formaldehyde is prepared as described in Example 1. 1300 parts by volume of anhydrous toluene are used as reaction medium, to which have been added 0.0592 part by weight of N-phenyl-N,N'-dimethyl formamidine dissolved in 4 parts by volume of anhydrous toluene. The reaction medium is cooled to —20° C. and the formaldehyde is introduced into the reaction medium over a period of two hours. The product is worked up as described in Example 1. 92 g. of pure white polyoxymethylene are obtained, corresponding to a yield of 86% (calculated on the amount of formaldehyde=107 g. actually introduced into the polymerization vessel). The intrinsic viscosity of the polymer is 0.96 (measured in butyrolactone at 150° C.).

Example 5

Monomeric formaldehyde is produced by the thermal decomposition of paraformaldehyde. The monomeric formaldehyde is mixed in the pyrolysis vessel with pure, dry nitrogen and thereafter conducted through an extensive cooling system at a temperature of —20° C. The formaldehyde is liquefied in a second cooling system at a temperature of —85° C. and supplied to the polymerization vessel, which is charged with 1000 parts by volume of anhydrous toluene. 0.036 part by weight of benzamidine dissolved in 3 parts by volume of anhydrous toluene is then introduced into the reaction medium with complete exclusion of air. The monomeric liquid formaldehyde is introduced dropwise into the polymerization vessel over a period of 2 hours while stirring and cooling to —20° C. An opaque suspension of high-molecular weight polyoxymethylene is formed. The product is worked up as described in Example 1 and 105 g. of pure white polyoxymethylene are isolated. The yield corresponds to 97.2% of the quantity of formaldehyde (108 g.) introduced into the polymerization vessel. The polyoxymethylene thus obtained has an intrinsic viscosity of 0.78 (measured in butyrolactone at 150° C.).

Example 6

Monomeric formaldehyde is produced by the thermal decomposition of α-polyoxymethylene and liquefied as described in Example 5. 1000 parts of anhydrous toluene, to which has been added a solution of 0.1088 part by weight of N,N'-diphenyl benzamidine in 40 parts by volume of anhydrous toluene are introduced into a polymerization vessel. The liquid, anhydrous formaldehyde is introduced dropwise into the polymerization medium over a period of 2 hours and while stirring and cooling to —20° C. After working up as described in Example 1, 98 g. of pure white polyoxymethylene are isolated, this corresponding to a yield of 97%, based on the amount of formaldehyde (101 g.) introduced into the polymerization vessel. The intrinsic viscosity of the polyoxymethylene is 2.25 (measured in butyrolactone at 150° C.).

Example 7

Anhydrous, gaseous formaldehyde is introduced, as described in Example 1, and over a period of 2 hours, into a solution of 0.050 part by weight of 1,3,5-trimethylisomelamine in 1300 parts by volume of anhydrous toluene. After working up as described in Example 1, 133 g. of pure white polyoxymethylene are obtained, this corresponding to a yield of 9.5%, based on the formaldehyde (138 g.) introduced into the polymerization vessel. The intrinsic viscosity of the polyoxymethylene is 1.1 (measured in butyrolactone at 150° C.).

Example 8

0.0447 part by weight by benziminoethyl ether, dissolved in 3 parts by volume of anhydrous toluene, is added to 1000 parts by volume of anhydrous toluene. In a manner similar to that employed in Example 5, liquid formaldehyde is introduced dropwise into the polymerization medium over a period of 2½ hours and while stirring and cooling to —20° C. The product is worked up as described in Example 1. The resulting dry pure white polyoxymethylene weighs 138 g., this being 95% of the formaldehyde (145 g.) introduced into the reaction vessel. The intrinsic viscosity of the polymer product is 0.99 (measured in butyrolacetone at 150° C.).

Example 9

A solution of 0.0483 part by weight of benzylidene isobutylamine in 3 parts by volume of anhydrous toluene is added to 1000 parts by volume of anhydrous toluene. Liquid formaldehyde is introduced dropwise as described in Example 5 into the reaction medium, while stirring and cooling to —20° C. Polymerization is complete after 2 hours and the product is worked up as described in Example 1. 115 g. of pure white polyoxymethylene are obtained. The yield is 96%, based on the quantity of formaldehyde (120 g.) introduced into the polymerization vessel. The intrinsic viscosity of the product is 0.94 (measured in butyrolacetone at 150° C.).

Example 10

The procedure is analogous to that of Example 5. A solution of 0.0381 part by weight of ε-caprolactim methyl ether in 3 parts by volume of anhydrous toluene is added to 1000 parts by volume of anhydrous toluene. The liquid formaldehyde is introduced dropwise into the reaction medium over a period of 2 hours and while stirring and cooling to —20° C. The product is worked up as described in Example 1. 94 g. of pure white polyoxymethylene are obtained. The yield is 90.5%, based on the formaldehyde (104 g.) introduced into the polymerization vessel. The intrinsic viscosity of the polymerization product is 0.92 (measured in butyrolactone at 150° C.).

Example 11

Following the procedure described in Example 1, gaseous anhydrous formaldehyde is introduced into a solution of 0.0784 part by weight of benzal phenyl hydrazone in 1300 parts by volume of anhydrous toluene. Polymerization is complete after 2 hours. The resulting pure white polyoxymethylene weighs 111 g., this being 90.5%, calculated on the formaldehyde (124 g.) introduced into the reaction vessel. The instrinsic viscosity of the product is 0.75 (measured in butyrolacetone at 150° C.).

Example 12

Monomeric formaldehyde is prepared by the thermal decomposition of α-polyoxymethylene and liquefied as described in Example 5. 1000 parts by volume of anhydrous toluene to which has been added a solution of 0.0336 part by weight of dimethyl ketazine in 3 parts by volume of anhydrous toluene are introduced into a polymerization vessel. The liquid formaldehyde is introduced dropwise into the reaction medium over a period of 2 hours and while stirring and cooling to —20° C. The product is worked up as described in Example 1. 127 g. of pure white polyoxymethylene are isolated, this corresponding to a yield of 97%, based on the formaldehyde (131 g.) introduced into the polymerization vessel. The intrinsic viscosity of the polyoxyethylene, measured in butyrolactone at 150° C., is 0.82.

In the aforementioned examples 0.5% solutions of polyoxymethylene are used for determining the intrinsic viscosity.

We claim:

1. A process for the production of high molecular weight polyoxymethylenes, which comprises polymerizing monomeric formaldehyde in a substantially anhydrous inert organic solvent in the presence of a catalytic amount of an organic nitrogen compound having the formula

wherein R is selected from the group consisting of hydrogen, a $C_1$ to $C_{10}$ alkyl, a $C_1$ to $C_{10}$ alkoxide, a $C_1$ to $C_{10}$ aminoalkyl, a $C_5$ to $C_7$ cycloalkyl, a $C_5$ to $C_7$ cycloalkyl ether, a $C_5$ to $C_7$ aminocycloalkyl, a phenyl, a phenoxy, an aminophenyl, a tolyl, a tolyloxy, an aminotolyl, a chlorophenyl, a chlorophenoxy, and an amino-chlorophenyl radical; the open valence of the nitrogen atom is attached to a member selected from the group consisting of hydrogen, a $C_1$ to $C_{10}$ alkyl, a phenyl, a benzyl, a $C_1$ to $C_{10}$ aminoalkyl, an aminophenyl, and a $C_1$ to $C_{10}$ iminoalkyl radical; and the open valence of the carbon atom is attached to a member selected from the group consisting of hydrogen, amino, a $C_1$ to $C_{10}$ alkyl, phenyl, a $C_5$ to $C_7$ cycloalkyl, a $C_1$ to $C_{10}$ aminoalkyl, an aminophenyl, and a $C_5$ to $C_7$ aminocycloalkyl radical; and the two said valences of the nitrogen and carbon atom may also be attached together to form a melamine ring, said polymerization being conducted at a temperature from $-120°$ C. to $+100°$ C., and then separating the high molecular weight polyoxymethylene from the inert organic solvent.

2. The process of claim 1 wherein said organic nitrogen compound is present in an amount of about 0.1 to 0.00001 mol per 1000 parts by volume of said inert organic solvent.

3. In a process for the production of high molecular weight polyoxymethylenes by polymerizing formaldehyde in a substantially anhydrous medium at a temperature between $-90$ and $+40°$ C. in the presence of a formaldehyde polymerization catalyst, the improvement comprising employing as the catalyst a catalytic amount of N-phenyl-N',N',N'',N''-tetramethyl guanidine.

4. In a process for the production of high molecular weight polyoxymethylenes by polymerizing formaldehyde in a substantially anhydrous medium at a temperature between $-90$ and $+40°$ C. in the presence of a formaldehyde polymerization catalyst, the improvement comprising employing as the catalyst a catalytic amount of pentamethyl guanidine.

5. In a process for the production of high molecular weight polyoxymethylenes by polymerizing formaldehyde in a substantially anhydrous medium at a temperature between $-90$ and $+40°$ C. in the presence of a formaldehyde catalyst, the improvement comprising employing as the catalyst a catalytic amount of N-phenyl-N,N'-dimethyl formamidine.

6. In a process for the production of high molecular weight polyoxymethylenes by polymerizing formaldehyde in a substantially anhydrous medium at a temperature between $-90$ and $+40°$ C. in the presence of a formaldehyde polymerization catalyst, the improvement comprising employing as the catalyst a catalytic amount of N,N'-diphenyl benzamidine.

7. In a process for the production of high molecular weight poloxymethylenes by polymerizing formaldehyde in a substantially anhydrous medium at a temperature between $-90$ and $+40°$ C. in the presence of a formaldehyde polymerization catalyst, the improvement comprising employing as the catalyst a catalytic amount of benziminoethyl ether.

References Cited by the Examiner

UNITED STATES PATENTS

| 2,237,092 | 4/41 | Swain et al. | 260—67 |
| 2,989,511 | 6/61 | Schnizer | 260—67 |
| 3,017,380 | 1/62 | D'Alelio | 260—67 |

FOREIGN PATENTS 560,984  7/58  Canada.

WILLIAM H. SHORT, *Primary Examiner.*

MILTON STERMAN, H. N. BURSTEIN, *Examiners.*